April 25, 1967

R. A. MATTHEWS ET AL 3,315,703

COMPOSITE TUBING PRODUCT

Filed Sept. 30, 1965

*INVENTOR.*
RICHARD A. MATTHEWS
HANS A. JOHANSEN

By *Teare, Fetzer & Teare*

ATTORNEYS

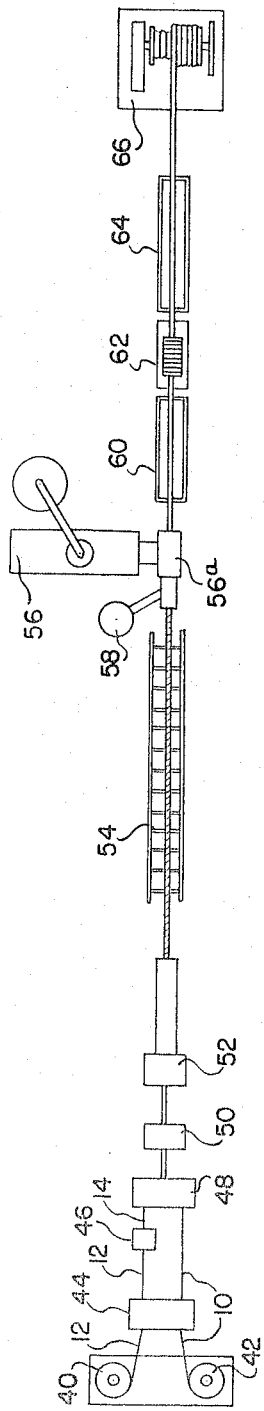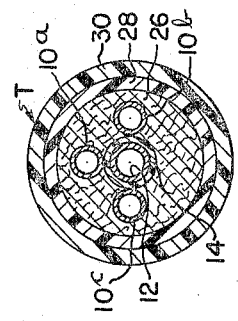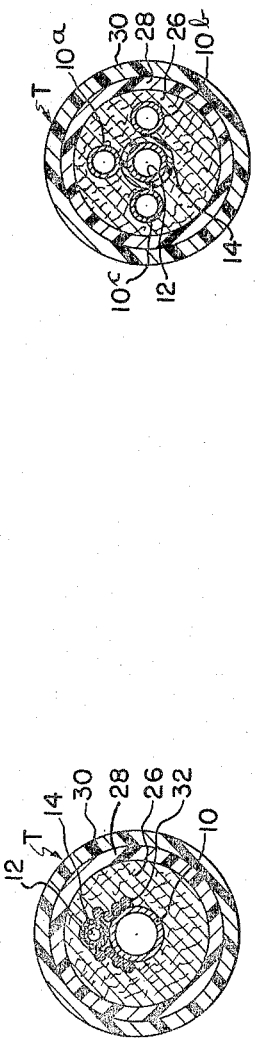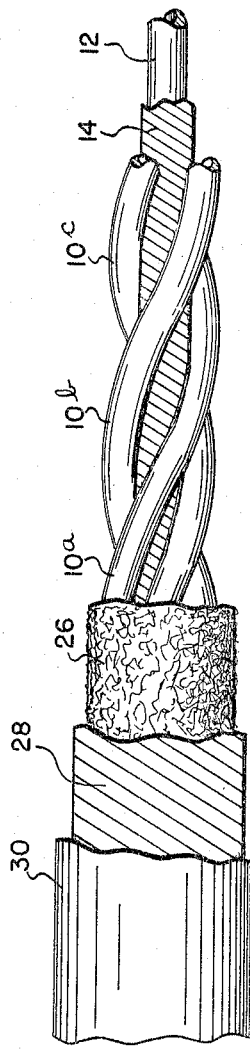

United States Patent Office 3,315,703
Patented Apr. 25, 1967

3,315,703
COMPOSITE TUBING PRODUCT
Richard A. Matthews, Chagrin Falls, and Hans A. Johansen, Mantua, Ohio, assignors to Samuel Moore and Company, Mantua, Ohio, a corporation of Ohio
Filed Sept. 30, 1965, Ser. No. 491,803
15 Claims. (Cl. 138—111)

This invention relates in general to composite tubing and more particularly, to a composite tubing which is adapted for use in conveying a fluid, either liquid or gas, from one point to another, and at the same time maintaining the temperature of the conveyed fluid substantially constant.

This type of tubing finds its principal application in the chemical processing and petroleum refining industry, and is used, for example, for conveying a sample of fluid from a process line, or a reaction vessel to an automatic instrument, such as a continuous sampling instrument—for example a chromatograph or infra-red spectograph. Samples of the fluid taken under these conditions generally must be maintained at a relatively elevated temperature, because the viscosity of the fluid must be kept as low as possible, and moreover, in case of a gas sample being transmitted, the gaseous sample must not be permitted to condense.

Heretofore, sampling lines were made up at the site, by supporting a steam carrying copper pipe from a point of sampling, to the instrumentation that is adapted to receive the sample, and then utilizing a sample tube of stainless steel for transmitting the sample. In many instances, the entire structure was then wrapped with a metal tape, or covered with pitch, in order to protect it from the weather. The structure tended to be custom constructed at the site where the materials were to be used. Not only was it expensive and difficult to fabricate a piping arrangement at the location, but also as a result of such custom construction, the heat conductivity from one end of the sampling structure to the other was not always uniform and often resulted in random cold-spots.

It has been further known to provide a composite tubing product having metallic sampling line means in juxtaposed continuous relation with metallic heating line means, flexible filler material, outer thermo-barrier, and a flexible protective outer sheath. It was found that while such structure gave substantial improvements over the prior art, difficulty occurred in random hot-spots being established due to the contact of the metal tubing with one another.

Accordingly, it is a principal object of the present invention to provide a composite tubing for sampling fluids which effectively overcomes the above and other related disadvantages of heretofore known similar types of tubing.

Another object of the present invention is to provide a mass produced composite tubing particularly adapted for use such as in sampling work, which may be readily installed, which is of uniform construction from one end thereof to the other end thereof, thereby providing more uniform and accurate results from the use of the tubing, and which is more economical to make than the prior custom arrangements.

A further object of the present invention is to provide a novel composite tubing for sampling fluids which provide a ready-made flexible, durable product which is capable of being cut into lengths at the point of application and which may be readily installed.

A still further object of the invention is to provide a novel composite tubing which is adapted for use in carrying sampling fluids, wherein the tubing is of uniform construction throughout its length, and providing consistent and accurate results from the sample taken.

A still further object of the invention is to provide a novel sampling tubing which may maintain the sampling fluid at a constant temperature throughout the flow of the fluid without the development of random hot-spots along the path of travel of the fluid.

A still further object of the present invention is to provide a novel composite tubing for sampling fluid comprising, a heat line means, a combination heat transmitting and insulating barrier surrounding said heat line means, a sampling line means, filler means, and a thermo-barrier means surrounding the sampling and heat line means, and a flexible sheath of polymeric material encompassing the thermo-barrier means.

Other objects and advantages of the invention will be apparent from the following description taken in conjunction with the accompanying drawings, wherein:

FIG. 5 is a transverse cross-sectional view of a further modification of the present invention;

FIG. 6 is a transverse cross-sectional view of another modification of the invention;

FIG. 7 is a partially cut-away and partially cross-sectional elevational view of a further modification of composite tubing product made in accordance with the invention;

FIG. 8 is a more or less diagrammatic, top plan view, of apparatus disposed in an organized system, for producing the composite tubing product illustrated for instance in FIGS. 1 and 2.

Figure 1:
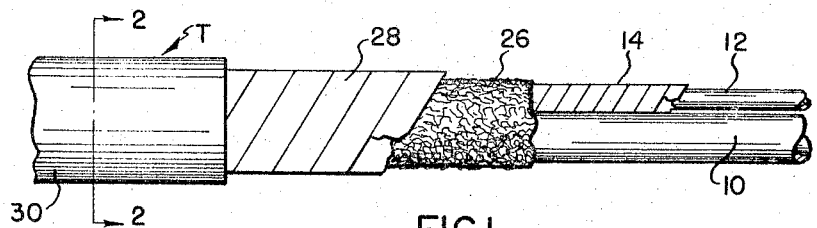
FIG. 1 is a partially cut-away elevational view of a composite tubing product produced in accordance with the instant invention.
Figure 2:
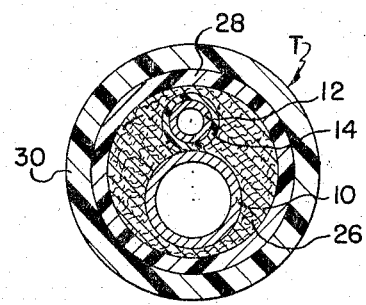
FIG. 2 is a transverse cross-sectional view taken generally along the plane of line 2—2 of FIG. 1 looking in the direction of the arrows.

Referring now to the drawings, and more particularly to FIGS. 1 and 2 thereof, there is shown a piece of composite tubing T comprising a sampling or control line 10 and a heating line 12 running parallel to the control line 10. Both the sampling line 10 and the heating line 12 are made of good heat transmitting material such as metallic material. The sampling line 10 may be formed, for instance, of stainless steel, and the heating line 12 may be formed of copper. The heating line 12 is adapted to carry a heating medium such as steam so as to maintain the fluid in the sampling line means at a near constant temperature.

In accordance with the present invention, either the sampling line 10 or the heating line 12 is encompassed by a sheath of material having controlled heat transmission and insulation characteristics. In FIGS. 1 and 2 the control sheath 14 surrounds the heating line means 12. The control sheath 14 is composed of a spirally wound contiguous tape. It is understood that the control sheath could be extruded onto the heating line 12 or could be an elongated sleeve which is wrapped around the tube and then sealed along the seam such as by a heat sealing. It is essential, however, that the control sheath be comprised of material which will permit maximum heat transfer from the heating tube 12 to the sampling tube 10 while at the same time providing sufficient insulation, and uniform distribution of the heat to eliminate or greatly reduce random hot-spots. One preferred material for the control sheath is Mylar. Mylar, a trademark, is a polyethylene terephthalate polyester film of tough, strong characteristics.

Figure 3:
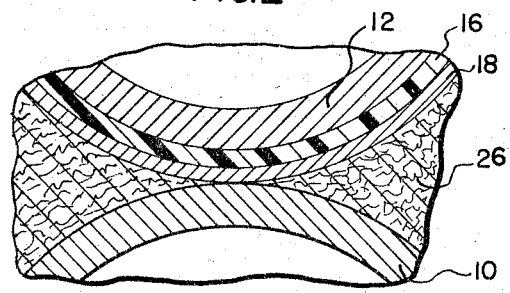
FIG. 3 is a fragmentary, cross-sectional view of a composite tubing product illustrating a modification of the invention.
Figure 4:
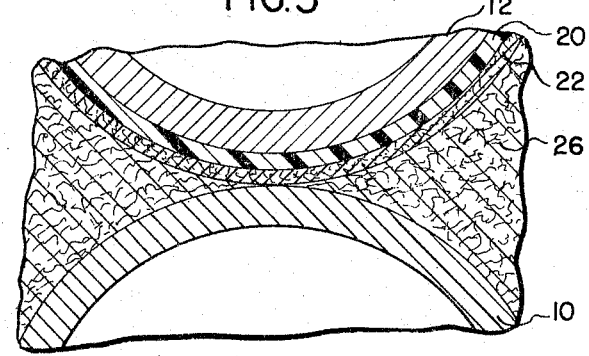
FIG. 4 is a fragmentary, transverse cross-sectional view of still another modification of the present invention.

The control sheath may also be in the laminated form as shown in FIG. 3. The heating line 12 may be surrounded, for example, by a lamination comprising an inner layer 16 in the form of a thin film, such as of Mylar; and an outer layer 18 in the form of a thin sheet of metallic foil, such as aluminum, copper or steel. FIG. 4 illustrates another form of lamination wherein the heating line 12 is surrounded by an inner layer 20 of a thin film of Mylar and an outer layer of asbestos 22. It has been found that by the use of the aforesaid constructions, the heating line 12 is able to perform its essential funtion of maintaining the liquid surging through the sampling tube 10 at a constant temperature while at the same time preventing the creation of random hot-spots between the line means.

As shown in FIGS. 1 and 2, it is preferred that the heating and sampling lines 10 and 12 respectively be encompassed by a layer 26 of filler material to give a generally cylindrical or uninterrupted configuration to the bundle of juxtaposed lines 10 and 12. The layers 26 of filler material may be formed of fibrous material, such as for instance, jute or other filamentary material.

In the embodiments of FIGS. 1 and 2, the filler material 26 is surrounded by a good thermo-barrier 28, such as for instance a laminated Dacron-asbestos tape known as Mylar and having good heat insulating characteristics. Dacron, a trademark, is a synthetic polyester fiber produced by the condensation of terephthalic acid and ethylene glycol. Mylar, a trademark, is a polyethylene terephthalate polyester film of tough, strong characteristics. The thermo-barrier 28 may be applied in an overlapping spiral fashion as illustrated in FIG. 1. The tubing is completed by an outer sheath or jacket 30 of flexible, polymeric material, to add to the corrosion resistance of the composite tubing and prevent weathering thereof. This outer jacket may be formed of any suitable flexible, polymeric material, such as for instance, the polyvinyl chlorides, polyethylenes, polyurethanes, neoprenes, or fluorocarbons (e.g. Teflon). Teflon is a trademark of the Du Pont Company.

FIG. 5 ilustrates a modification of the invention as shown in FIGS. 1 and 2 wherein a plurality of preferably good heat transmitting elongated elements, such as copper wires or rods 32 are disposed in the valleys defined between the juxtaposed tubes 10 and 12. The lines 10 and 12 and the rods 32 may then be surrounded by the filler material 26, such as was described in connection with FIGS. 1 and 2. The filler material is then surrounded by a thermo-barrier 28 and the tubing completed by a protective outer sheath 30, as described in connection with FIGS. 1 and 2. The use of such rods 32 in cooperation with the control sheath 14 provides a means for maximum heat transfer with the elimination or great reduction of hot-spots. In another embodiment, not shown, additional rods may be placed in the space occupied by the fibrous filler, and the fibrous filler eliminated. In such embodiment the rods perform the functions of heat transfer and of filling out the composite tubing.

From the foregoing description, it will be seen that the use of the control sheath 14 causes the heat build-up in the heating line 12 to be dispersed, evenly distributed and controlled so as to prevent random hot-spots, while the bundles or rods 32 provide a means for the greater transfer of the controlled heat from the heating line 12 to the sampling line 10.

It is to be understood that in accordance with the present invention, more than one heating line or more than one sampling line may be used. For example, FIG. 6 shows an arrangement wherein the heating line 12 is surrounded by a control sheath 14, and the control sheath is surrounded by three sampling lines 10a, 10b, and 10c.

Moreover, as illustrated, it is to be understood that the sampling line 10 need not be parallel to the heating line 12, but one or more of such sampling lines may be disposed spirally of the control sheath 14 which surrounds the heating line 12. FIG. 7 illustrates a plurality of such sampling lines 10a, 10b and 10c in spiral juxtaposition with the heating line 12. Such an arrangement provides a more uniform degree of heating of the sampling line so as to best control random cold-spots as well as hot-spots.

FIG. 8 diagrammatically illustrates apparatus set up in an organized system for producing the tubing shown, for instance, in FIGS. 1 and 2 of the drawings. Such apparatus may comprise a reel 40 of the heating tubing 12 and a reel 42 of the sampling tubing 10. It will be understood, of course, that if more sampling line runs are utilized in the composite tubing T as for example in the three runs illustrated in FIG. 6, then more reels of sampling tubing will be required.

The heating and sampling lines may be moved through a straightener 44 consisting of spaced, powered, rotatable grooved cylindrical members (not shown) for moving and straightening the tubing from the reels, while maintaining separation between the tubing, and then the heating line 12 may be moved through a conventional taping mechanism 46 for applying the control sheath 14 thereto. The sampling tube 10 in making the hose illustrated in FIG. 10 bypasses the control sheath application station 46. The sampling line 10 and the heating lines 12 having the control sheath 14 thereon may then be passed through a second straightener 48 which aligns the tubes so that the control sheath 14 of the heating line 12 is in juxtaposed relation with the sampling line 10.

The aforesaid juxtaposed tubing separated by the control sheath 14, may then be moved through a conventional filler applying mechanism 50 for applying the flexible filler material 26 to the tubing. This mechanism 50 may include means for chopping up fibers, for instance, if the fibers are comprised of fiberglass or the like, and for mixing such fibers with a suitable adhesive material as is conventionally known in the fiber art, and then applying the fibrous materials as by blowing or laying it down in a suitable manner about the associated sampling line 10 and the control-sheath-surrounded heating line 12 to produce the uninterrupted surface configuration. The fiber coated tubing may then be passed through a conventional taping mechanism 52 for applying the thermo-barrier layer 28 thereto. The tubing may then be moved on the conventional roller conveyor 54, through a conventional extruding mechanism 56, including crosshead 56a where hot plastic material is applied to form the flexible outer sheath 30 of the composite tubing. There may also be provided in conjunction with mechanism 56, a conventional vacuum unit 58, for sizing the outer sheath and maintaining a predetermined thickness thereof on the thermo-barrier layer 28. From the crosshead 56a of the extruder, the hot tubing may move first into a preliminary cooling tank 60 filled with, for instance water, for setting the plastic material forming the outer sheath 30, and then a haul-off mechanism 62 of any suitable type and, as for instance, the well known caterpillar type, may be utilized to move the tubing to a further main cooling tank 64 for cooling and curing of the tubing adequately for winding upon reel mechanism 66 where it is ready for use.

If the composite tubing is of the type illustrated for instance in FIG. 5 then the fiber application station 50 will be preceded by a filler wire applicator station (not shown) wherein the filler wires or rods 32 are applied such as by being mounted upon reels and moved with or laid down in the valleys between the sampling line and the control sheath of the heating line means to give a more effective heat transfer.

Where the sampling lines are spiralled about the heating line 12, as in FIG. 7, the operations of spiralling may be performed as known in the art.

The composite tubing of the invention enjoys greatly reduced costs of installation, as compared to the custom-made structures heretofore used, is of considerably less bulk and of a smaller cross-section and lighter weight per foot as compared to such prior arrangement, and provides a means whereby maximum heat transfer is maintained while preventing the development of hot spots so as to produce much more accurate and uniform results from the samples taken thereby.

From the foregoing discussion and accompanying drawings, it will be seen that the invention provides a novel, composite tubing comprising a sampling line means and a highly heat conductive heating line means with the transfer of heat from the heating line means to the sampling line means being controlled by a control sheath, with the aforesaid arrangement being disposed in a compact unit having a filler, an outer heat barrier and a protective outer sheath for protecting the tubing against corrosion and weather, whereby such tubing may be readily installed and handled and whereby maximum heat transfer is accomplished without the development of random hot-spots.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

We claim:

1. A deformable, composite tubing product of uniform construction throughout its length, adapted for use as sampling tubing, for transferring fluid from a point of sampling to a point of use, comprising, heat conducting sampling line means, heat conducting heating line means, a heat control sheath surrounding and in engagement with at least one of said line means, the said heat control sheath being disposed throughout its length in heat transferring relation to the other said line means, said control sheath being of lesser heat conductivity than said heating line means, a thermo-barrier layer encompassing said line means and control sheath, and a flexible plastic outer sheath covering said thermo-barrier layer.

2. A composite tubing in accordance with claim 1 wherein said heating line means and said sampling line means are metallic.

3. A composite tubing in accordance with claim 1 wherein the control sheath is disposed about the heating line means.

4. A composite tubing in accordance with claim 2 wherein said heating line means comprises a copper tube, and said sampling line means comprises a stainless steel tube.

5. A composite tubing in accordance with claim 1 including a plurality of heat transmitting wires disposed between and in intimate contact with said other line and said control sheath.

6. A composite tubing in accordance with claim 1 including at least one heating line means and at least two sampling line means.

7. A composite tubing in accordance with claim 1 wherein said heating line means is spirally wound about said sampling line means.

8. A composite tubing according to claim 7 wherein the said control sheath surrounds the said sampling line means.

9. A composite tubing in accordance with claim 1 including filler means disposed intermediate said line means and said thermo-barrier layer.

10. A composite tubing in accordance with claim 1 wherein said control sheath is composed of a lamination including a thin metallic layer, and a layer of material having lesser heat conductivity than said heating line means.

11. A composite tubing in accordance with claim 10 wherein said thin metallic layer is disposed adjacent said sampling line means and said layer of lesser conductivity is disposed adjacent said heating line means.

12. A composite tubing in accordance with claim 1 wherein said control sheath comprises a layer of laminated asbestos-polyester tape.

13. A composite tubing in accordance with claim 6 wherein the said control sheath surrounds the said heating line means.

14. A composite tubing in accordance with claim 1 wherein the sampling line means is spirally wound about said heating line means.

15. A composite tubing in accordance with claim 14 wherein said control sheath surrounds said heating line means.

References Cited by the Examiner

UNITED STATES PATENTS

| 2,611,585 | 9/1952 | Boling | 165—180 X |
| 2,773,513 | 12/1956 | Isenberg | 138—111 |
| 2,778,609 | 1/1957 | Peeps | 165—180 X |
| 2,934,096 | 4/1960 | Banks | 138—111 |
| 2,971,538 | 2/1961 | Brumbach | 138—111 |
| 3,151,633 | 10/1964 | Shuman | 138—111 X |
| 3,269,422 | 8/1966 | Matthews et al. | 165—172 X |

FOREIGN PATENTS 627,031 7/1949 Great Britain.

ROBERT A. O'LEARY, *Primary Examiner.*

M. A. ANTONAKAS, *Assistant Examiner.*